United States Patent
Tsujimoto et al.

(10) Patent No.: US 6,884,543 B2
(45) Date of Patent: Apr. 26, 2005

(54) MATERIAL FOR POSITIVE ELECTRODE AND SECONDARY BATTERY

(75) Inventors: Hisashi Tsujimoto, Fukushima (JP); Yoshikatsu Yamamoto, Fukushima (JP); Junji Kuyama, Kanagawa (JP); Masayuki Nagamine, Fukushima (JP); Atsuo Omaru, Fukushima (JP); Hiroaki Tanizaki, Miyagi (JP)

(73) Assignee: Sony Corporation, Tokyo (JP)

( * ) Notice: Subject to any disclaimer, the term of this patent is extended or adjusted under 35 U.S.C. 154(b) by 48 days.

(21) Appl. No.: 09/822,926

(22) Filed: Mar. 30, 2001

(65) Prior Publication Data

US 2002/0012842 A1 Jan. 31, 2002

(30) Foreign Application Priority Data

Mar. 30, 2000 (JP) ........................................ 2000-093378

(51) Int. Cl.[7] .............................. H01M 4/50; H01M 4/52
(52) U.S. Cl. ..................... 429/223; 429/224; 429/231.1; 429/231.3
(58) Field of Search .......................... 429/94, 223, 224, 429/231.1, 231.2, 231.3, 231.95, 221, 231.5, 231.6, 229; 423/594.2, 594.4, 594.6, 596, 599, 594.15

(56) References Cited

U.S. PATENT DOCUMENTS

| | | | |
|---|---|---|---|
| 5,429,890 A | | 7/1995 | Pynenburg et al. ......... 429/192 |
| 5,683,834 A | * | 11/1997 | Fujimoto et al. ........... 429/221 |
| 5,952,125 A | * | 9/1999 | Bi et al. ................... 429/231.2 |
| 6,030,726 A | * | 2/2000 | Takeuchi et al. .......... 429/231.8 |
| 6,255,020 B1 | * | 7/2001 | Yamashita et al. ...... 429/231.95 |

FOREIGN PATENT DOCUMENTS

| | | |
|---|---|---|
| WO | WO 99/53556 | 10/1999 |
| WO | WO 99/59214 | 11/1999 |

\* cited by examiner

*Primary Examiner*—Jonathan Crepeau
(74) *Attorney, Agent, or Firm*—Sonnenschein, Nath & Rosenthal LLP

(57) ABSTRACT

Disclosed is a non-aqueous electrolyte secondary battery having an excellent preservation characteristic at a high temperature and charging/discharging cycle characteristic. A rolled body in which a strip-shape positive electrode and negative electrode are rolled with a separator in-between is provided inside a battery can. The positive electrode contains $Li_xMn_{2-y}Ma_yO_4$ (where, Ma is at least one element selected from the group consisting of metal elements other than Mn, and B) and $LiNi_{1-z}Mb_zO_2$ (where, Mb is at least one element selected from the group consisting of metal elements other than Ni, and B). By replacing part of Mn and Ni with other elements, the crystal structure can be stabilized. Thereby, the capacity retention ratio after preservation at a high temperature, and a heavy load discharging power under a high electric potential cutoff can be improved. The mean particle size of particles of the above-mentioned oxides are preferable to be 30 $\mu$m and below so that an excellent charging/discharging cycle characteristic can be obtained.

22 Claims, 2 Drawing Sheets

MATERIAL FOR POSITIVE ELECTRODE AND SECONDARY BATTERY

RELATED APPLICATION DATA

The present application claims priority to Japanese Application No. P2000-093378 filed Mar. 30, 2000, which application is incorporated herein by reference to the extent permitted by law.

BACKGROUND OF THE INVENTION

The present invention relates to a non-aqueous electrolyte secondary battery comprising a positive electrode which contains manganese-contained complex oxide containing lithium (Li) and manganese (Mn), and nickel-contained complex oxide containing lithium (Li) and nickel (Ni).

Recently, in accordance with development in electronic technology, a number of small-size portable electron devices such as VTRs (video tape recorder) with a built-in camera, cellular phones and laptop computers have come into wide use, and miniaturization and lightening of the devices have been the subject. As a portable electric source used for the devices, small and light batteries with high energy density, specifically secondary batteries, have been at the stage of development. A large expectation has been put on lithium-ion secondary batteries since the battery has a higher energy density compared to lead batteries or nickel-cadmium batteries of the related art using an aqueous liquid electrolyte.

In lithium-ion secondary batter of the related art, it is known to use a carbonaceous material for a negative electrode and lithium-contained complex oxide such as lithium-cobalt complex oxide, lithium-manganese complex oxide and lithium-nickel complex oxide for a positive electrode. The battery using lithium-cobalt complex oxide as a material for a positive electrode has been widely put in practical use since it is most excellent in terms of the battery capacity, cost, thermal stability and the like in each respect. On the contrary, the one using lithium-manganese complex oxide and the ones using lithium-nickel complex oxide are excellent in terms of cost for the source material and a stable supply even though the former has a small battery capacity and insufficient preservation characteristic at a high temperature, and the latter has a relatively low thermal stability. The two-types have been studied for future use. For example, recently, a technique is disclosed (see Japanese Patent Application Laid-open Hei 8-45498) in which the defects of both types are supplied by mixing lithium-manganese complex oxide and lithium-nickel complex oxide. Thereby, expansion/contraction of the positive electrode is thereby suppressed at the time of charging/discharging, and the charging/discharging cycle characteristic is improved.

However, the secondary battery using the mixture of lithium-manganese complex oxide and lithium-nickel complex oxide has a shortcoming that the characteristic is deteriorated when preserved at a high temperature of, for example, 45° C. to 60° C. Specifically, the battery, when used for information terminal for cellular phones or the like, requires capacity with heavy load (in a state of large current density) and high termination voltage. However, a sufficient capacity cannot be obtained after preservation at a high temperature. Also, in the above-mentioned secondary battery, a sufficient charging/discharging cycle characteristic cannot always be obtained depending on the particle diameter of lithium-manganese complex oxide and lithium-nickel complex oxide. Furthermore, in order to satisfy the recent demand for high energy density, it is necessary to obtain a larger capacity.

SUMMARY OF THE INVENTION

The present invention has been designed to overcome the forgoing problems. The object of the invention is to provide a secondary battery with an excellent preservation characteristic at a high temperature, and improved charging/discharging cycle characteristic and battery capacity.

A non-aqueous electrolyte secondary battery of the present invention comprises a positive electrode, a negative electrode and an electrolyte, wherein the positive electrode contains; manganese-contained complex oxide containing lithium (Li), manganese (Mn), at least one kind of a first element selected from the group consisting of a metal element other than manganese and boron (B), and oxygen (O), while a mole ratio of the first element to manganese (Mn) (the first element/manganese) lies within the range of 0.01/1.99 to 0.5/1.5, both inclusive; and nickel-contained complex oxide containing lithium (Li), nickel (Ni), at least one kind of a second element selected from the group consisting of a metal element other than nickel and boron (B), and oxygen (O), while a mole ratio of the second element to nickel (Ni) (the second element/nickel) lies within the range of 0.01/0.99 to 0.5,/0.5, both inclusive.

A non-aqueous electrolyte secondary battery of the present invention contains manganese-contained complex oxide containing lithium, manganese and a first element, and nickel-contained complex oxide containing lithium, nickel and a second element. Thereby, an excellent battery characteristic can be obtained even after preservation at a high temperature.

Other and further objects, features and advantages of the invention will appear more fully from the following description.

DETAILED DESCRIPTION OF THE EMBODIMENT

Embodiment

Figure 1:
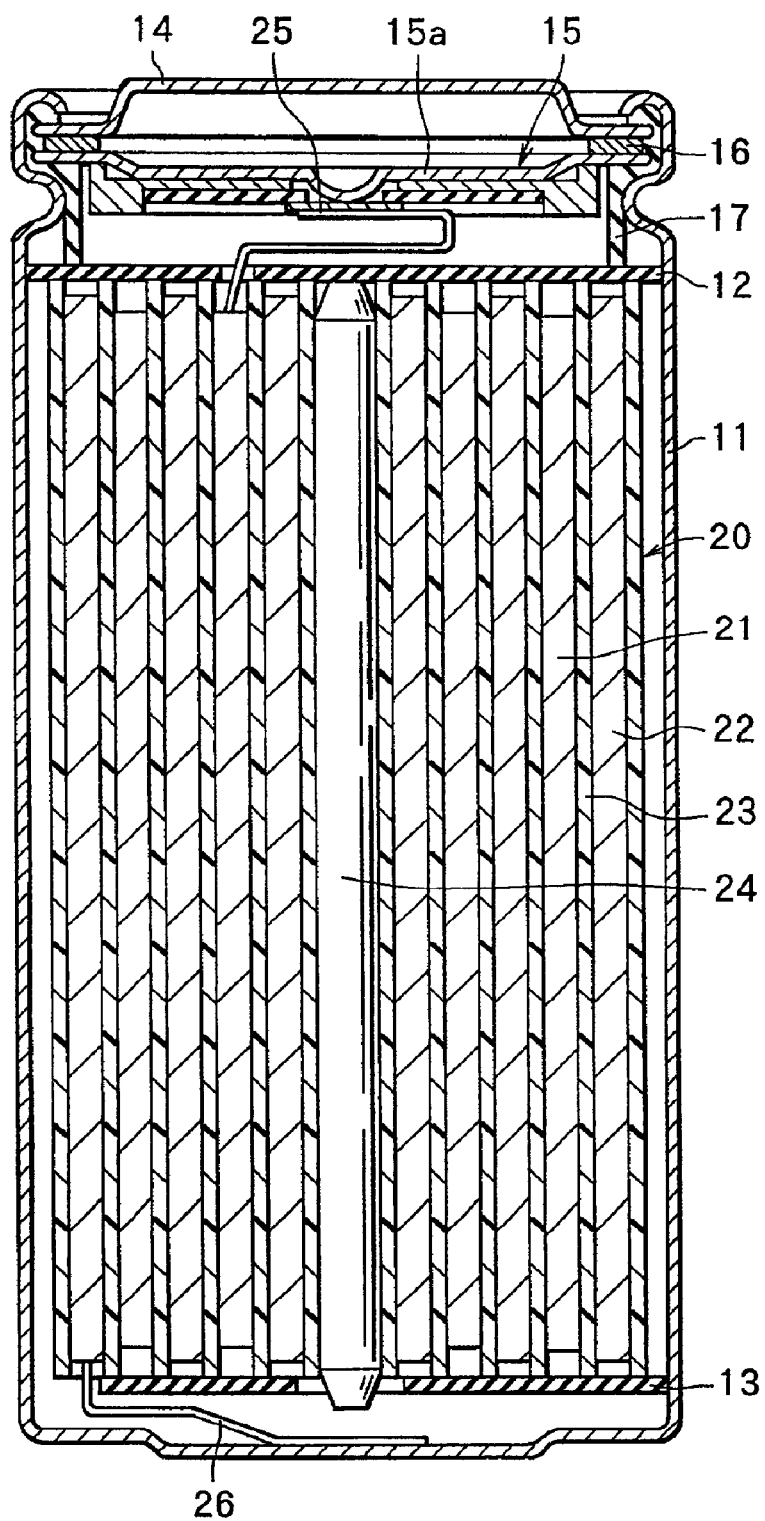
FIG. 1 is a cross section showing the configuration of a non-aqueous electrolyte secondary battery according to the embodiment of the present invention.

In the followings, an embodiment of the invention will be described in detail by referring to the drawings.

FIG. 1 shows the cross sectional structure of a non-aqueous electrolyte secondary battery according to an embodiment of the invention. The secondary battery is of what is called a cylindrical type. In a battery can 11 having a substantially hollow cylindrical column shape, a rolled electrode body 20 obtained by rolling a band-shaped positive electrode 21 and negative electrode 22 with a separator 23 in-between is provided. The battery can 11 is made of, for example, iron (Fe) plated with nickel (Ni). One end of the battery can 11 is closed and the other end is open. A pair of insulating plates 12 and 13 is placed vertical to the peripheral face of the roll so as to sandwich the rolled electrode body 20.

A battery cover 14, and a safety valve mechanism 15 and a PTC (positive temperature coefficient) device 16 which are provided inside the battery cover 14 are attached to the open end of the battery can 11 by being caulked through a gasket 17, and the battery can 11 is sealed. The battery cover 14 is made of, for example, a material similar to that of the battery can 11. The safety valve mechanism 15 is electrically connected to the battery cover 14 through PTC device 16. When an internal short circuit occurs or the internal pressure of the battery increases to a predetermined value or higher due to heating from outside or the like, a disk plate 15a is turned upside down, thereby disconnecting the electrical connection between the battery cover 14 and the rolled electrode body 20. The PTC device 16 is used to limit a current by an increase in resistance value when the temperature rises to thereby prevent abnormal heating caused by a heavy current. The PTC device 16 is made of, for example, barium titanate based semiconductor ceramics, mixture conductive particle and polymer material. The gasket 17 is made of, for example, an insulating material and asphalt is applied thereon.

The rolled electrode body 20 is rolled around, for example, a center mandrel 24 as a center. A positive electrode lead 25 made of aluminum (Al) is connected to the positive electrode 21 and a negative electrode lead 26 made of nickel (Ni) is connected to the negative electrode 22. The positive electrode lead 25 is electrically connected to the battery cover 14 by being welded to the safety valve mechanism 15 while the negative electrode lead 26 is electrically connected to the battery can 11 by being welded.

The positive electrode 21 is composed of, for example, a positive electrode mixture layer and a positive electrode collector layer in a structure that the positive electrode mixture layer is provided on one side or both sides of the positive electrode collector layer. The positive electrode collector layer is made of, for example, metallic foil such as aluminum foil, nickel foil, or stainless foil. The positive electrode mixture layer contains, for example, manganese-contained complex oxide and nickel-contained complex oxide as will be described hereinafter, and further contains a conductive material such as graphite and a binder such as polyvinylidene fluoride when necessary.

Manganese-contained complex oxide contains lithium (Li), manganese (Mn), at least one kind of a first element selected from the group consisting of a metal element other than manganese and boron (B), and oxygen (O). The manganese-contained complex oxide has a cubic (spinel) structure or a tetragonal structure, and the first element is present by being replaced with manganese atoms in part of the site. The chemical formula for manganese-contained complex oxide is $Li_xMn_{2-y}Ma_yO_4$ where Ma represents the first element. The value of x is preferable to lie within the range of $0.9 \leq x \leq 2$, and the value of y within the range of $0.1 \leq y \leq 0.5$. In other words, the molar ratio of the first element to manganese (Mn) (Ma/Mn) is preferable to lie within the range of 0.01/1.99 and 0.5/1.5, both inclusive.

Nickel-contained complex oxide containing lithium (Li), nickel (Ni), at least one kind of a second element selected from the group consisting of a metal element other than nickel and boron (B), and oxygen (O). The nickel-contained complex oxide has, for example, a layered structure and the second element is present by being replaced with nickel atoms in part of the site. The common chemical formula for the nickel-contained complex oxide is $LiNi_{1-z}Mb_zO_2$ where Mb represents the second element. The composing ratio of lithium (Li) and oxygen (O) is not limited to Li:O=1:2. The value of z is preferable to lie within the range of $0.1 \leq z \leq 0.5$. In other words, the molar ratio of the second element to nickel (Ni) (Mb/Ni) is preferable to lie within the range of 0.01/0.99 and 0.5/0.5, both inclusive.

The crystal structure of the manganese-contained complex oxide and nickel-contained complex oxide are considered to be stabilized by replacing part of manganese or nickel with other elements mentioned above. Thereby, the preservation characteristic at a high temperature can be improved in the secondary battery. The molar ratio of the first element to manganese (Mn) (Ma/Mn) is set to lie within the range of 0.01/1.99 and 0.5/1.5, both inclusive, and the molar ratio of the second element to nickel (Ni) (Mb/Ni) within the range of 0.01/0.99 and 0.5/0.5, both inclusive, since, if less or more than the set value, a sufficient effect cannot be obtained and the high load discharging capacity is decreased after preservation at a high temperature.

Specifically, the preferable first element is at least one material selected from a group consisting of iron (Fe), cobalt (Co), nickel (Ni), copper (Cu), zinc (Zn), aluminum (Al), tin (Sn), chromium (Cr), vanadium (V), titanium (Ti), magnesium (Mg), calcium (Ca) and strontium (Sr). Also, specifically, the preferable second element is at least one material selected from a group consisting of iron (Fe), cobalt (Co), manganese (Mn), copper (Cu), zinc (Zn), aluminum (Al), tin (Sn), boron (B), gallium (Ga), chromium (Cr), vanadium (V), titanium (Ti), magnesium (Mg), calcium (Ca) and strontium (Sr). The reason is that the manganese-contained complex oxide with such first element and the nickel-contained complex oxide with such second element are relatively easy to obtain and are chemically stable.

It is preferable that the mixing ratio of the nickel-contained complex oxide to the manganese-contained complex oxide in the positive electrode 21, in terms of mass fraction (nickel-contained complex oxide/manganese-contained complex oxide), lies within the range of 90/10 and 10/90. The reason is that when the content of the manganese-contained complex oxide is larger than the set value, the internal resistance is increased after preservation at a high temperature since the manganese-contained complex oxide is largely deteriorated in an electrolyte, which will be described later, in a high-temperature atmosphere. Thereby, the capacity is decreased. Another reason is that the nickel-contained complex oxide has a low discharging potential so that the high load discharging capacity becomes small at high potential cutoff after preservation at a high temperature when the contents of the nickel-contained complex oxide is larger than the set value.

The mean particle size of the manganese-contained complex oxide and the nickel-contained complex oxide is preferable to be 30 $\mu$m and below. The reason is that expansion and contraction of the positive electrode 21 due to charging and discharging cannot be suppressed when the mean particle size is larger than the set value, so that sufficient charging/discharging cycle characteristic cannot be obtained at ambient temperature.

The manganese-contained complex oxide can be formed by a mixing lithium compound, a manganese compound and a compound containing the first element in a desired ratio and then calcining it by applying a heat treatment at a temperature of 600° C. to 1000° C. in an oxidizing atmosphere. The nickel-contained complex oxide can be obtained in the same manner except a lithium compound, a nickel compound and a compound containing the second element are used instead. Examples of compounds used as a base material are carbonate, hydroxide, oxide, nitrate and organic acid salt.

The negative electrode 22 has a structure in which, for example, a negative electrode mixture layer is provided on one or both sides of a negative electrode collector layer like the positive electrode 21. The negative electrode collector layer is formed of metallic foil such as copper foil, nickel foil, or stainless steel foil. The negative electrode mixture layer is formed containing either, for example, lithium metal or a negative electrode material which can occlude or release lithium at a potential of, for example, 2 V or less with the lithium metal potential being the standard. The layer further contains a binder such as polyvinyliden fluoride when necessary.

Examples of the material for a negative electrode capable of occluding and releasing lithium are a metal or a semiconductor capable of forming alloy or compound with lithium, and the alloy and compound of these. These materials are preferable since an excellent battery capacity can be obtained. For example, the metal, semiconductor, and alloy and compound of these are expressed by a chemical formula $Mi_sMii_tLi_u$. In the chemical formula, Mi represents at least one kind of metal element or semiconductor element capable of forming alloy or compound with lithium, and Mii represents at least one kind of metal element or semiconductor element other than lithium and Mi. The values of s, t, and u are s 0, t≧0, and u≧0, respectively.

Examples of the metals, the semiconductors, and alloys and compounds of those are magnesium (Mg), boron (B), aluminum (Al), gallium (Ga), indium (In), silicon (Si), germanium (Ge), tin (Sn), lead (Pb), arsenic (As), antimony (Sb), bismuth (Bi), cadmium (Cd), silver (Ag), zinc (Zn), hafnium (Hf), zirconium (Zr), yttrium (Y), and alloys and compounds of these. Specific examples of the alloys and compounds are LiAl, LiAlMiii (Miii denotes at least one kind element selected from 2A-Group, 3B-Group or 4B-Group metal elements or semiconductor elements), AlSb and CuMgSb.

As the metal elements and the semiconductor elements capable of forming alloys and compounds with lithium, 4B-Group metal elements and semiconductor elements are preferable. Silicon (Si) and tin (Sn) are more preferable, and silicon is most preferable. The alloys and compounds of these such as MivSi or MivSn (Miv is at least one kind selected from the group consisting of metal elements and semiconductor elements other than silicon and tin) are also preferable. Specific examples of these are $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, and $ZnSi_2$.

Other example of the compound of metals and semiconductors capable of forming alloys and compounds with lithium is the ones containing at least one kind of nonmetal element and one kind of 4B-Group element except carbon (C). The compound may contain at least one kind selected from the group consisting of lithium, and metal elements and semiconductor elements except 4B-Group. Examples of the compounds are SiC, $Si_3N_4$, $Si_2N_2O$, $Ge_2N_2O$, $SiO_v$ (0<v≦2), $SnO_w$ (0<w≦2) LiSiO and LiSnO.

Examples of the material for a negative electrode capable of occluding and releasing lithium are carbon materials, metal oxides, and polymer compounds. The carbon materials are most preferable since the materials can obtain an excellent cycle characteristic. Examples of the carbon materials are non-graphitizing carbon, artificial graphite, coke, graphite, glasslike carbon, polymer compound organic compound calcined materials, carbon fiber, activated carbon and carbon black. The coke included pitch coke, needle coke and petroleum coke. The high polymer compound calcined material is a material obtained by calcining a high polymer material such as phenolic resin or furan resin at an appropriate temperature so as to be carbonated. Examples of the metal oxides are iron oxide, ruthenium oxide and molybdenum oxide, and examples of high polymer materials are polyacetylene and polypyrrole.

The separator 23 is formed of, for example, a porous film made of polyolefin-based material such as polypropylene or polyethylene or a porous film made of an inorganic material such as ceramic nonwoven cloth. A structure in which two or more kinds of the porous films are stacked may also be used.

The separator 23 is impregnated with a liquid electrolyte. The electrolyte is obtained by dissolving, for example, lithium salt in a solvent as electrolyte salt. Examples of appropriate non-aqueous solvents are propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, ester propionitrile, anisole ester, acetate ester, ester butyrate and propionate. One of these nonaquoeous solvents alone, or two or more kinds are mixed to be used.

Examples of lithium salt are $LiClO_4$, $LiAsF_6$, $LiPF_6$, $LiBF_4$, $LiB(C_6H_5)_4$, $CH_3SO_3Li$, $CF_3SO_3Li$, LiCl and LiBr. One of the materials alone, or two or more kinds are mixed to be used.

The non-aqueous electrolyte secondary battery can be fabricated, for example, in the following manner.

First, a positive electrode mixture is prepared by mixing manganese-contained complex oxide, nickel-contained complex oxide, and if necessary, a conductive agent and a binder. The positive electrode mixture is dispersed in a solvent such as N-methyl-2-pyrrolidone thereby to obtain a positive electrode mixture slurry in a form of paste. The positive electrode mixture slurry is applied on the positive electrode collector layer and then the solvent is dried. A positive electrode mixture layer is formed by performing compression-mold thereon using a roller presser or the like. Thereby, a positive electrode 21 is fabricated.

Next, a positive electrode mixture is prepared by using material for a negative electrode, and if necessary, mixing a binder. The negative electrode mixture is dispersed in a solvent such as N-methyl-2-pirrolidone thereby to obtain a negative electrode mixture slurry in a form of paste. The negative electrode mixture slurry is applied on the negative electrode collector layer and then the solvent is dried. A negative electrode mixture layer is formed by performing compression-mold thereon using a roller presser or the like. Thereby, a negative electrode 22 is fabricated.

The positive electrode lead 25 is attached to the positive electrode layer by welding or the like while a negative electrode lead 26 is attached to the negative electrode collector layer in the same manner. Then, the positive electrode 21 and the negative electrode 22 are rolled through the separator 23, the top of the positive electrode lead 25 is welded to the safety valve mechanism 15, the top of the negative electrode lead 26 is welded to the battery can 11, and the rolled positive electrode 21 and negative electrode 22 are sandwiched by a pair of insulating plates 12 and 13 being enclosed in the battery can 11. Then, an electrolyte is injected inside the battery can 11 and the separator 23 is impregnated with the electrolyte. The battery cover 14, the safety valve mechanism 15 and the PTC device 16 are fixed to the open end of the battery can 11 via the gasket 17 by caulking. In such a manner, the secondary battery shown in FIG. 1 is fabricated.

The secondary battery acts as follows.

When the secondary battery is charged, for example, lithium ions are released from the positive electrode 21 and occluded by the negative electrode 22 via the electrolyte with which the separator 23 is impregnated. When the secondary battery is discharged, for example, lithium ions are released from the negative electrode 22 and occluded by the positive electrode 21 via the electrolyte with which the separator 23 is impregnated. The positive electrode 21 is formed containing the manganese-contained complex oxide including the first element, and the nickel-contained complex oxide including the second element so that the battery capacity can be maintained even after preservation at a high temperature, thereby obtaining a high capacity retention ratio. Also, a large discharging energy can be obtained when a high load discharging is performed under the condition of high potential cutoff at, for example, 3.3 V.

As described, in the secondary battery according to the embodiment, the battery capacity can be maintained even after preservation at a high temperature thereby improving a high capacity retention ratio since the positive electrode 21 is formed to contain the manganese-contained complex oxide containing lithium, manganese, and the first element in a predetermined composition rate, and the nickel-contained complex oxide containing lithium, nickel, and the second element in a predetermined composition rate. Also, a large discharging energy can be obtained when a high load discharging is performed under the condition of high potential cutoff at, for example, 3.3 V after preservation at a high temperature. Therefore, when the battery is used for cellular phones, laptop computers or the like, an excellent battery characteristic can be maintained even if the battery is in the high temperature at about 40° C. to 60° C. by, for example, being left in a car, or the temperature rises when being used.

Specifically, the battery capacity after preservation at a high temperature can be improved by setting the mixing ratio of the nickel-contained complex oxide and the manganese-contained complex oxide, in terms of mass ratio (nickel-contained complex oxide/manganese-contained complex oxide), within the range of 90/10 and 10/90.

Also, expansion and contraction of the positive electrode 21 due to charging and discharging can be suppressed by setting each mean particle size of the manganese-contained complex oxide and the nickel-contained complex oxide is 30 μm and below. Thereby, a sufficient charging/discharging characteristic can be obtained at ambient temperature.

The battery capacity can be improved if the negative electrode 22 is formed to contain at least one selected from the group consisting of a metal and a semiconductor capable of forming an alloy and a compound with lithium, an alloy and a compound of these. In addition, the cycle characteristic can be improved if the negative electrode 22 is formed to contain a carbonaceous material.

EXAMPLE

Specific examples of the embodiment will be described in detail by referring to FIG. 1.

Examples 1-1 to 1-8

First, manganese-contained complex oxide $Li_xMn_{2-y}Cr_yO_4$ containing lithium, manganese, and chromium as the first element (Ma) was fabricated by mixing lithium carbonate ($Li_2CO_3$), manganese dioxide ($MnO_2$) and dichromic trioxide ($Cr_2O_3$) and then calcining it for five hours at 850° C. in air. In Examples 1 to 8, the mixing ratio of the base materials were varied and the manganese-contained complex oxide was adjusted so as to have the composition shown in Table 1. Then, the manganese-contained complex oxide obtained thereby was pulverized to have the mean particle size of 20μ. Measurement of the mean particle size is performed by laser diffraction.

TABLE 1

|  | Manganese-contained oxide | | Nickel-contained oxide | Retention rate of general discharging capacity after preservation at high temperature (%) | High load discharging energy after preservation at high temperature (Wh) | Capacity retention rate at 200th cycle at normal temperature (%) |
| --- | --- | --- | --- | --- | --- | --- |
|  | x | y | z |  |  |  |
| Example 1-1 | 1.0 | 0.2 | 0.2 | 97 | 3.4 | 87 |
| Example 1-2 | 0.9 | 0.2 | 0.2 | 97 | 3.3 | 86 |
| Example 1-3 | 1.1 | 0.2 | 0.2 | 97 | 3.4 | 89 |
| Example 1-4 | 1.0 | 0.5 | 0.2 | 97 | 3.3 | 87 |
| Example 1-5 | 1.0 | 0.1 | 0.2 | 97 | 3.4 | 87 |
| Example 1-6 | 1.0 | 0.0 | 0.2 | 95 | 3.5 | 87 |
| Example 1-7 | 1.0 | 0.2 | 0.01 | 97 | 3.5 | 86 |
| Example 1-8 | 1.0 | 0.2 | 0.5 | 96 | 3.3 | 87 |
| Comparative Example 1-1 | 1.0 | 0.0 | 0.2 | 89 | 3.0 | 86 |
| Comparative Example 1-2 | 1.0 | 0.6 | 0.2 | 95 | 2.8 | 85 |
| Comparative Example 1-3 | 1.0 | 0.2 | 0.0 | 89 | 3.1 | 84 |
| Comparative Example 1-4 | 1.0 | 0.2 | 0.6 | 95 | 2.7 | 85 |

Nickel-contained complex oxide $Li_xNi_{1-z}CO_zO_2$ containing lithium, nickel, and cobalt as the second element (Mb) was fabricated by mixing lithium hydroxide (LiOH), nickel monoxide (NiO) and cobalt monoxide (CoO) and then calcining it for five hours at 750° C. in air. In Examples 1-1 to 1-8, the mixing ratio of the base materials were also varied and the nickel-contained complex oxide was adjusted so as to have the composition shown in Table 1. Then, the manganese-contained complex oxide obtained thereby was pulverized to have the mean particle size of 10 μm. Measurement of the mean particle size is also performed by laser diffraction.

A positive electrode mixture is prepared by mixing 10 parts by volume of the manganese-contained complex oxide and 90 parts by volume of the nickel-contained complex oxide, and then mixing an electrode mixture containing 7 parts by volume of graphite as a conductive agent and 3 parts by volume of polyvinylidene fluoride as a binder with respect to 90 parts by volume of the mixed powder. The positive electrode mixture was dispersed in a solvent such as N-methyl-pyrrolidone thereby to obtain a positive electrode mixture slurry. The positive electrode mixture slurry was homogeneously applied on both sides of the positive electrode collector layer made of aluminum foil 20 μm thick and then the solvent was dried. A negative electrode mixture layer was formed by performing compression-mold thereon. Thereby, a positive electrode 21 was fabricated. Then, a positive electrode lead 25 made of aluminum was attached to one end of the positive electrode collector layer.

A carbonaceous molded body is fabricated by adding 30 parts by volume of coal tar pitch to 100 parts by volume of carbon-based coaks as a filler to be mixed at about 100° C., being compression-molded, and then applying a heat treatment at 1000° C. or less. Then, a graphitizing molded body was fabricated by repeating pitch impregnation/heat treatment process a number of times in which the carbonaceous molded body was impregnated with coal tar pitch dissolved at 200° C. or less was impregnated and applying a heat treatment at 1000° C. or less, then applying a heat treatment at 2700° C. or less. After that, the graphitizing molded body was pulverized and classified thereby to obtain powder.

The structural analysis of the graphite powders was performed by X-ray diffraction. The interplaner spacing of (002) face was 0.337 nm and the thickness of C-axial crystal of (002) was 50.0 nm. The true density obtained by pycnometer was 2.23 g/cm$^3$, the bulk density was 0.83 g/cm$^3$, and the mean shape parameter was 10. The specific surface area obtained by BET (Bruuauer, Emmett, Teller) was 4.4 m$^2$, the particle distribution obtained by laser diffraction was as follows: the mean particle size was 31.2 $\mu$m; the cumulative 10% particle diameter was 12.3 $\mu$m, the cumulative 50% particle size was 29.5 $\mu$m, the cumulative 90% particle size was 53.7 $\mu$m. Furthermore, mean value of the fracture strength of the graphite particles obtained by using Micro Compression Testing Machine (MCTM; product of Shimadzu Corporation) was 7.0×10$^7$ Pa.

After obtaining the graphite powder, a negative electrode mixture was prepared by mixing 90 parts by volume of the graphite powder and 10 parts by volume of polyvinylidene fluoride as a binder. The negative electrode mixture was dispersed in a solvent such as N-methyl-pyrrolidone thereby to obtain a negative electrode mixture slurry. The negative electrode mixture slurry was homogeneously applied on both sides of the positive electrode collector layer made of strip-shape copper foil 10 $\mu$m thick and then the solvent was dried. A negative electrode mixture layer was formed by performing compression-mold thereon. Thereby, a negative electrode 22 was fabricated. Then, a negative electrode lead 26 made of copper was attached to one end of the negative electrode collector layer.

After forming the positive electrode 21 and the negative electrode 22, a separator 23 made of a microporous polypropylene film 25 $\mu$m thick was prepared. Then, the negative electrode 22, the separator 23, the positive electrode 21 and then separator 23 were stacked in this order and spirally rolled around a core having a diameter of 4.0 mm a number of times and the outermost portion was fixed by an adhesive tape. Thereby, a rolled electrode body 20 was fabricated.

After forming the rolled electrode body 20, the rolled electrode body 20 was sandwiched by a pair of insulating plates 12 and 13. The negative electrode lead 26 was welded to the battery can 11 while welding the positive electrode lead 25 to the safety valve mechanism 15, and then the rolled electrode body 20 was enclosed in the battery can 11 made of iron which was nickel plated. The external diameter of the battery can 11 was 18.0 mm, the inner diameter 17. 38 mm, the thickness 0.31 mm, and the height 65 mm, respectively. After enclosing the rolled electrode body 20 inside the battery can 11, an electrolyte is injected inside the battery can 11. As the electrolyte, LiPF$_6$ was dissolved as electrolyte salt in a solvent, in which the same quantity of propylene carbonate and 1,2-dimethoxyethane were mixed, by a ratio of 1.0 mol/l. Then, the battery cover 14 was caulked to the battery can 11 through the gasket 17 to which asphalt was applied. Thereby, the cylindrical-type secondary battery shown in FIG. 1 for each Example 1-1 to 1-8 was fabricated. The secondary batteries of Examples 1-1 to 1-8 were identical except that the composition of the manganese-contained complex oxide or the nickel-contained complex oxide was varied.

The preservation characteristic at a high temperature and the charging/discharging cycle characteristic at ambient temperature of the secondary battery were examined. As the preservation characteristic at a high temperature, a general discharging capacity retention ratio under a general discharging condition after preservation at a high temperature, and a high load discharging energy under a high load discharging condition were obtained, respectively. The results are shown in Table 1, respectively.

The general discharging capacity retention ratio after preservation at a high temperature was obtained in the following manner. First, the initial discharging capacity was obtained by discharging in a homeothermal tank at 23° C. before preservation. Charging was performed at a constant current of 1 A until the battery voltage reaches 4.2 V, then continued for a total of three hours at a constant voltage of 4.2 V. Discharging was performed at a constant current of 0.5 A until the terminal voltage (cutoff voltage) of 3.0 V. This was set to be the general charging/discharging condition. Then, the battery was re-charged under the general charging/discharging condition and reserved for two weeks in an oven at 60° C. After that, discharging was once performed to the terminal voltage of 3.0 V in a homeothermal tank at 23° C., ten cycles of charging/discharging were performed under the general charging/discharging condition. The highest value of the ten cycles of charging/discharging was set to be the discharging capacity after preservation at a high temperature and the fraction against the initial discharging capacity was set to be the general discharging capacity retention ratio after preservation at a high temperature.

The high load discharging energy test was performed in the following manner. The battery was reserved for two weeks at 60° C. and discharging was performed to the terminal voltage of 3.0 V in a homeothermal tank at 23° C. Then, charging was performed under the above-mentioned general charging condition and heavy load discharging test was performed until the terminal voltage of 3.3 V at a constant current of 2.8 A.

The charging/discharging cycle characteristic was obtained by performing 200 cycles of charging/discharging in a homeothermal tank at 23° C. under the general charging/discharging condition, and obtaining the fraction of the 200$^{th}$ discharging capacity against the 2$^{nd}$ discharging capacity (capacity retention ratio).

As Comparative Examples 1-1 to 1-4 to Examples 1-1 to 1-8, the non-aqueous electrolyte secondary batteries were fabricated in the same manner as those of Examples 1-1 to 1-8 except that the compositions of the manganese-contained complex oxide or the nickel-contained complex oxide was varied as shown in Table 1. In Comparative Examples 1-1 to 1-4, the preservation characteristic at ambient temperature and the charging/discharging cycle characteristic at ambient temperature were also examined, respectively. The results are shown in Table 1, respectively.

As can be seen from Table 1, in Examples 1-1 to 1-8, high values were obtained on both the general charging capacity retention ratio after preservation at a high temperature and high load discharging energy after preservation at a high temperature (general discharging capacity retention ratio was 95% or more, high load discharging energy was 3.3 Wh or more). On the contrary, in Comparative Example 1-1 using the manganese-contained complex oxide in which manganese was not replaced with chrome, the general discharging capacity retention ratio after preservation at a high temperature was low, and in Comparative Example 1-2 using the manganese-contained complex oxide in which a large quantity of chrome was replaced with manganese, the high load discharging energy after preservation at a high temperature was small. The same results were true on Comparative Example 1-3 using the nickel-contained complex oxide in which nickel was not replaced with cobalt, and Comparative Example 1-4 using the nickel-contained complex oxide in which a large quantity of cobalt was replaced with nickel.

In short, it has been learned from the results that an excellent battery characteristic can be obtained even after preservation at a high temperature using manganese-contained complex oxide with the mole ratio of chromium to manganese (Cr/Mn) being within the range of 0.01/1.99 and 0.5/1.5, both inclusive; and nickel-contained complex oxide containing lithium with the mole ratio of cobalt (Co/Ni) being within the range of 0.01/0.99 and 0.5/0.5, both inclusive. An excellent charging/discharging cycle characteristic at ambient temperature can also be obtained on both cases.

Examples 1-9 to 1-20

As Comparative Examples 1-9 to 1-14, the secondary batteries were fabricated in the same manner as those of Example 1-1 except that the first element (Ma) in the manganese-contained complex oxide was changed as shown in Table 2. When forming the manganese-contained complex oxide, instead of chrome trioxide used in Example 1-1, cobalt monoxide was used in the Example 1-9, aluminum trioxide ($Al_2O_3$) in Example 1-10, magnesium monoxide (MgO) in Example 1-11, zinc monoxide (ZnO) in Example 1-12, tin monoxide (SnO) in Example 1-13, and cobalt monoxide and chrominum trioxide in Example 1-14.

Also, in Examples 1-15 to 1-20, the secondary batteries were fabricated in the same manner as those of Example 1-1 except that the second element (Mb) in the manganese-contained complex oxide was changed as shown in Table 2. When forming the nickel-contained oxide, instead of cobalt monoxide used in Example 1-1, diferrous trioxide ($Fe_2O_3$) was used in Example 1-15, aluminum trioxide ($Al_2O_3$) in Example 1-16, magnesium monoxide (MgO) in Example 1-17, zinc monoxide (ZnO) in Example 1-18, tin monoxide (SnO) in Example 1-19, and cobalt monoxide and aluminum trioxide in Example 1-20.

In the Comparative Examples 1-9 to 1-20, the preservation characteristic at a high temperature and the charging/discharging cycle characteristic at ambient temperature were also examined, respectively. The results are shown in Table 2 along with the results of Example 1-1.

As can be seen from Table 2, in Examples 1-9 to 1-20, high values were obtained like in Example 1-1 on both the general charging capacity retention ratio after preservation at a high temperature and heavy load discharging power after preservation at a high temperature (general discharging capacity retention ratio was 97% or more, high load discharging energy was 3.1 Wh or more). In short, it has been examined that the same high temperature preservation characteristic as in Example 1-1 can also be obtained by using the manganese-contained complex oxide in which an element other than chrome was contained as the first element or the nickel-contained complex oxide in which an element other than cobalt was contained as the second element.

Examples 1-21 to 1-25

The secondary batteries were fabricated in the same manner as that of Example 1-1 except that the mixing ratio of the manganese-contained complex oxide and the nickel-contained complex oxide was changed as shown in Table 3, respectively. In Comparative Example 1-5 to Examples 1-1 and 1-21 to 1-25, a secondary battery was fabricated in the same manner as that of Example 1-1 except that the manganese-contained oxide was not contained. Also, in Comparative Example 1-6 to Examples 1-1 and 1-21 to 1-25, a secondary battery was fabricated in the same manner as that of Example 1-1 except that the nickel-contained complex oxide was not contained. In Examples 1-21 to 1-25, Comparative Examples 1-5 and 1-6, the preservation char-

TABLE 2

| | 1st element of Manganese-contained oxide | 2nd element of Nickel-contained oxide | Retention rate of general discharging capacity after preservation at high temeprature (%) | High load discharging energy after preservation high temperature (Wh) | Capacity retention rate at 200th cycle at normal temeperature (%) |
|---|---|---|---|---|---|
| Example 1-1 | Cr | Co | 97 | 3.4 | 87 |
| Example 1-9 | Co | Co | 97 | 3.4 | 87 |
| Example 1-10 | Al | Co | 97 | 3.5 | 88 |
| Example 1-11 | Mg | Co | 97 | 3.4 | 88 |
| Example 1-12 | Zn | Co | 97 | 3.4 | 86 |
| Example 1-13 | Sn | Co | 97 | 3.4 | 88 |
| Example 1-14 | (Co0.5Cr0.5) | Co | 97 | 3.3 | 86 |
| Example 1-15 | Cr | Fe | 97 | 3.4 | 86 |
| Example 1-16 | Cr | Al | 97 | 3.2 | 87 |
| Example 1-17 | Cr | Mg | 97 | 3.1 | 87 |
| Example 1-18 | Cr | Zn | 97 | 3.2 | 88 |
| Example 1-19 | Cr | Sn | 97 | 3.1 | 87 |
| Example 1-20 | Cr | (Co0.5Al0.5) | 97 | 3.3 | 87 | acteristic at a high temperature and the charging/discharging cycle characteristic at ambient temperature were also examined in the same manner as Example 1-1. The results are shown in Table 3 along with the results of Example 1-1.

In short, it has been learned that an excellent preservation characteristic at a high temperature can be obtained by setting the mixing ratio of the nickel-contained complex oxide to the manganese-contained complex oxide, in terms

TABLE 3

|  | mixing ratio (parts by volume) | | Retention rate of general discharging capacity after preservation | High load discharging energy after preservation | Capacity retention rate at 200th cycle at |
| --- | --- | --- | --- | --- | --- |
|  | Manganese-contained oxide | Nickel-contained oxide | at high temeprature (%) | high temperature (Wh) | normal temeperature (%) |
| Example 1-1 | 10 | 90 | 97 | 3.4 | 87 |
| Example 1-21 | 20 | 80 | 96 | 3.4 | 88 |
| Example 1-22 | 40 | 60 | 95 | 3.5 | 88 |
| Example 1-23 | 60 | 40 | 94 | 3.6 | 87 |
| Example 1-24 | 80 | 20 | 93 | 3.6 | 86 |
| Example 1-25 | 90 | 10 | 91 | 3.4 | 86 |
| Comparative Example 1-5 | 0 | 100 | 97 | 2.9 | 86 |
| Comparative Example 1-6 | 100 | 0 | 89 | 3.3 | 88 |

As can be seen from Table 3, the more the manganese-contained complex oxide was contained, the larger the high load discharging energy after preservation at a high temperature was contained, and the more the nickel-contained complex oxide was contained, the higher the general discharging capacity retention ratio after preservation at a high temperature was contained. Specifically, in Example 1-1, and Comparative Examples 1-21 to 1-24, excellent values were obtained on both the general charging capacity retention ratio after preservation at a high temperature and high load discharging energy after preservation at a high temperature (general discharging capacity retention ratio was 93% or more, high load discharging energy was 3.4 Wh or more). On the contrary, in Comparative Example 1-5 in which the manganese-contained complex oxide was not contained, the high load discharging energy after preservation at a high temperature was small, and in Comparative Example 1-6 in which the nickel-contained complex oxide was not contained, the general discharging capacity retention ratio after preservation at a high temperature was low.

of mass ratio (nickel-contained complex oxide/manganese-contained complex oxide), within the range of 90/10 and 10/90. Also, an excellent result was obtained in terms of charging/discharging cycle characteristic at ambient temperature.

Examples 1-26 to 1-32

The secondary batteries were fabricated in the same manner as that of Example 1-1 except that mean particle diameters of the manganese-contained complex oxide and the nickel-contained complex oxide were changed as shown in Table 4. In Comparative Examples 1-26 to 1-32, the preservation characteristic at a high temperature and the charging/discharging cycle characteristic at ambient temperature were also examined, respectively. The results are shown in Table 4 along with the results of Example 1-1.

TABLE 4

|  | mean particle size | | Retention rate of general discharging capacity after preservation | High load discharging energy after preservation | Capacity retention rate at 200th cycle at |
| --- | --- | --- | --- | --- | --- |
|  | Manganese-contained oxide | Nickel-contained oxide | at high temeprature (%) | high temperature (Wh) | normal temeperature (%) |
| Example 1-1 | 20 | 10 | 97 | 3.4 | 87 |
| Example 1-25 | 30 | 10 | 97 | 3.4 | 87 |
| Example 1-26 | 1 | 10 | 97 | 3.5 | 88 |
| Example 1-27 | 0.1 | 10 | 97 | 3.6 | 88 |
| Example 1-28 | 10 | 30 | 97 | 3.4 | 87 |
| Example 1-29 | 10 | 0.1 | 97 | 3.4 | 88 |
| Example 1-30 | 40 | 10 | 96 | 3.1 | 80 |
| Example 1-31 | 10 | 40 | 96 | 3.1 | 79 |

As can be seen from Table 4, in Examples 1-1, and 1-26 to 1-30, excellent results were obtained on both the preservation characteristic at a high temperature and the capacity retention ratio at ambient temperature. On the contrary, in Examples 1-31 and 1-32, although an excellent result was obtained on the preservation characteristic at a high temperature, the capacity retention ratio at ambient temperature was 80% or less, which was insufficient. It has been learned from the results that the charging/discharging cycle characteristic at ambient temperature can be improved by setting mean particle size of the manganese-contained complex oxide and the nickel-contained complex oxide to be 30 µm and below.

Examples 2-1 to 2-2

Figure 2:
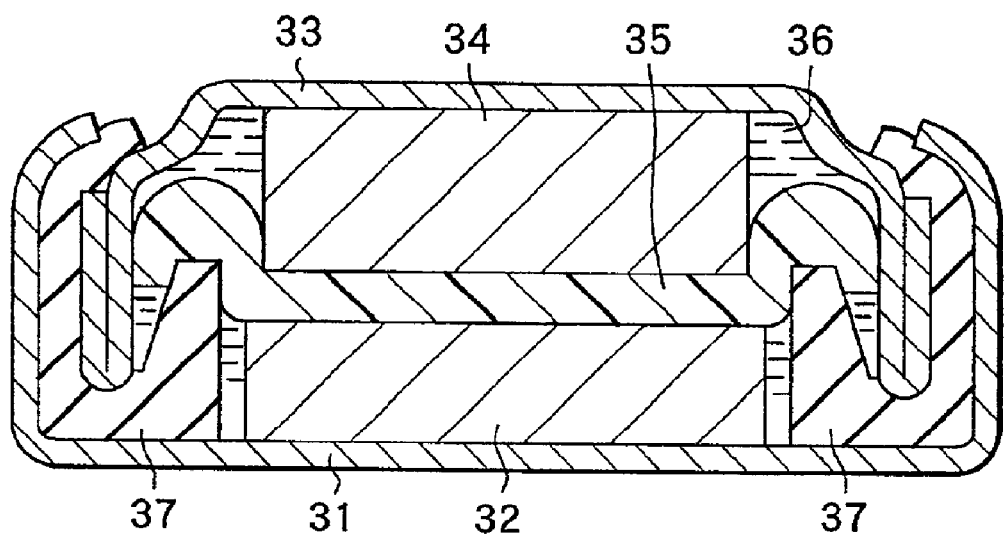
FIG. 2 is a cross section showing the configuration of a non-aqueous electrolyte secondary battery fabricated in Examples 2-1 to 2-4 of the present invention.

In Examples 2-1 to 2-2, a coin-type secondary battery as shown in FIG. 2 was fabricated. The secondary battery was fabricated in the following manner. A disc-like positive electrode 32 enclosed in an exterior can 31 and a disc-like negative electrode 34 enclosed in an exterior can 33 were stacked with a separator 35 in-between. Then, a liquid electrolyte 36 was injected inside and the peripheral edges were closed by caulking through an insulating gasket 37. The diameter of the battery was 20 mm and the height was 1.6 mm.

The positive electrode 32 was formed in the following manner. The manganese-contained complex oxide $LiMn_{1.9}Cr_{0.1}O_4$ and the nickel-contained complex oxide $LiNi_{0.8}Co_{0.2}O_2$ obtained like in Example 1-1 were mixed in the proportion shown in Table 5. Then, a positive electrode mixture obtained by mixing 6 parts by volume of graphite as a conductive agent and 3 parts by volume of polyvinylidene fluoride as a binder to 91 parts by volume of the mixed powder was compression-molded in a form of pellet.

In the Examples 2-1 to 2-3, the negative electrode 34 was formed by performing compression-mold on a negative electrode mixture in a form of pellet obtained by mixing 55 parts by volume of magnesium silicide ($Mg_2Si$) powder, 35 parts by volume of the graphite powder formed as in Example 1-1, and 10 parts by volume of polyvinylidene. In Example 2-2, the negative electrode 34 was formed by performing compression-mold on a negative electrode mixture in a form of pellet obtained by mixing 90 parts by volume of magnesium silicide ($Mg_2Si$) powder and 10 parts by volume of polyvinylidene.

In Comparative Examples 2-1 and 2-2 to Examples 2-1 to 2-4, the secondary battery was formed in the same manner as that of Example 2-1 except that either one of the manganese-contained complex oxide or the nickel-contained complex oxide was used. Also, in Comparative Example 2-3, the secondary battery was formed in the same manner as that of Example 2-1 except that the nickel-contained complex oxide was used for the positive electrode 32 and only the graphite powder was used for the negative electrode 34.

The discharging capacity, the load characteristic and the charging/discharging cycle characteristic of the secondary batteries in Examples 2-1 to 2-2 and Comparative Examples 2-1 to 2-3 were examined, respectively. The results are shown in Table 5, respectively.

Discharging was performed at 23° C. under the general charging/discharging condition described and the result of the $2^{nd}$ cycle was obtained thereby to obtain the discharging capacity. In this moment, charging was performed until voltage reaches 4.2V with constant current 3 mA, then with constant voltage of 4.2V, total charging time reaches 8 hours. Discharging was performed until terminal voltage (cutoff voltage) reaches 2.5V. This is determined as charging/discharging condition.

As the load characteristic, the ratio of load discharging capacity with respect to discharging capacity, that is, ($100^{th}$ discharging capacity against the $2^{nd}$ discharging capacity)× 100. Load discharging capacity is discharging capacity when charging/discharging was performed under load charging/discharging condition, charging is the same as discharging condition, discharging was performed until voltage reaches 2.5V with constant current 5.0 mA.

The charging/discharging cycle characteristic was obtained by performing 100 cycles of charging/discharging under the general charging/discharging condition, and by obtaining the ratio of the $100^{th}$ discharging capacity to the $2^{nd}$ discharging capacity (capacity retention ratio).

As can been seen from Table 5, when the negative electrode 34 was employed magnesium silicide, larger discharging capacity could be obtained. Further, when the

TABLE 5

| | mixing ratio of material for positive electrode | | | basic | negative | Capacity retention |
|---|---|---|---|---|---|---|
| | Mu-contained oxide | Ni-contained oxide | Material for negative electrode | discharge capacity (mAh) | electrode characteristic (%) | rate at 100th cycle |
| Example 2-1 | 50 | 50 | Mg2Si + graphite | 12.5 | 83 | 91 |
| Example 2-2 | 50 | 50 | Mg2Si | 16.3 | 81 | 83 |
| Comparative Example 2-1 | 100 | 0 | Mg2Si + graphite | 11.1 | 87 | 78 |
| Comparative Example 2-2 | 0 | 100 | Mg2Si + graphite | 14.2 | 76 | 83 |
| Comparative Example 2-3 | 0 | 100 | graphite | 9.9 | | | negative electrode 34 was employed magnesium silicide and graphite, excellent cycle characteristic could be achieved.

It has been examined that the discharging capacity could be more improved if the negative electrode 34 was formed to contain magnesium silicide or the like as for a metal or a semiconductor capable of forming an alloy and a compound with lithium, and an alloy and a compound of these. In addition, the cycle characteristic and the load characteristic could be improved along with the discharging capacity if the negative electrode 34 was formed to contain a carbonaceous material, and the above-mentioned material.

In the above-mentioned Examples, the composition of the manganese-contained complex oxide and the nickel-contained complex oxide was described by referring to a specific example. However, the same result as those of the above-mentioned Examples can be obtained by using other manganese-contained complex oxides and nickel-contained complex oxides instead of the ones used in the above-mentioned embodiment.

In the above-mentioned Examples 2-1 to 2-2m, the case of using magnesium silicide was described as for a metal or a semiconductor capable of forming an alloy and a compound with lithium, and an alloy and a compound of these. However, the same results as those of the above-mentioned Examples can be obtained by using other metals or a semiconductors, an alloy and a compound of these instead of the ones described in the above-mentioned Examples.

The invention has been described by referring to the embodiment and Examples. However, the invention is not limited to these but various modifications are possible. For example, in the above-mentioned embodiment and Examples, the secondary battery using the electrolyte made by dissolving lithium salt in a solvent is described. However, other electrolytes may be used such as a gel electrolyte in which an electrolyte solution containing lithium salt is held in a polymer material, a solid electrolyte in which lithium salt is dispersed onto a polymer having an ion conductivity, and an electrolyte made of solid inorganic conductor.

As a gel electrolyte, various kinds of polymers can be used provided they absorb the electrolyte solution making it to be in a form of gel. Examples of the polymers are, a fluoride-based polymer material such as polyvinylidene fluoride or a copolymer of vinylidene fluoride and hexafluoropropylene, ether-based polymer such as polyethylene oxide or a cross-linked body containing polyethylene oxide, and polyacrylonitrile. Specifically, fluoride-based polymer material is preferable since the redox stability is high.

As the high polymer used for the solid electrolyte, ether polymer material such as a polyethylene oxide or a cross-linked body containing polyethylene oxide, ester-based polymer such as polymethacrylate, and acrylate-based polymer can be used alone or by being mixed, or by being copolymerized in molecules. Examples of inorganic conductors are lithium nitride, polycrystal of lithium iodide or lithium fluoride, a mixture of lithium iodide and chromium trioxide, and a mixture of lithium iodide, lithium sulfide and diphosphorus sulfide.

In the above-mentioned embodiment and Examples, the cylindrical-type secondary battery having a rolled structure or the coin-type secondary battery are described by referring to a specific example. However, the invention can also be applied to secondary batteries having other structures. The invention can be applied to other types of secondary batteries such as a button-type, a square-type and a type in which electrode elements are provided inside a laminated film in addition to the cylindrical-type and the coin-type.

As described, in the secondary battery of the invention, the battery capacity can be maintained even after preservation at a high temperature thereby improving a high capacity retention ratio because the positive electrode is formed to contain the manganese-contained complex oxide containing lithium, manganese, and the first element in a predetermined composition rate, and the nickel-contained complex oxide containing lithium, nickel, and the second element in a predetermined composition rate. Also, a large discharging energy can be obtained when a high load discharging is performed under the condition of high potential cutoff at, for example, 3.3 V after preservation at a high temperature. Therefore, when the battery is used for cellular phones, laptop computers or the like, an excellent battery characteristic can be maintained even if the battery is in a high temperature of about 40° C. to 60° C. by, for example, being left in a car, or the temperature rises when being used.

Specifically, in the secondary battery of the invention, the mixing ratio of the nickel-contained complex oxide to the manganese-contained complex oxide, in terms of mass ratio (nickel-contained complex oxide/manganese-contained complex oxide), is set to lie within the range of 90/10 and 10/90. Therefore, the battery capacity after preservation at a high temperature can be further improved.

In the secondary battery in one aspect of the invention, each mean particle size of the manganese-contained complex oxide and the nickel-contained complex oxide is set to be 30 μm and below. Therefore, expansion and contraction of the positive electrode due to charging and discharging can be suppressed. Thereby, a sufficient charging/discharging characteristic can be obtained at ambient temperature.

Obviously many modifications and variations of the present invention are possible in the light of the above teachings. It is therefore to be understood that within the scope of the appended claims the invention may be practiced otherwise than as specifically described.

What is claimed is:

1. A non-aqueous electrolyte secondary battery comprising a positive electrode, a negative electrode and a non-aqueous electrolyte, wherein the positive electrode contains:
   (a) a manganese-contained complex oxide containing:
      (i) lithium (Li);
      (ii) manganese (Mn);
      (iii) a first element (Ma) selected from the group consisting of zinc (Zn), cobalt (Co), aluminum (Al), tin (Sn), chromium (Cr), and magnesium (Mg), wherein the chemical formula of the manganese-contained complex oxide is $Li_xMn_{2-y}Ma_yO_4$ and wherein x is the range of $0.9 \leq x \leq 2.0$ and y is in the range of $0.01 \leq y \leq 0.50$, both inclusive; and
   (b) a nickel-contained complex oxide containing:
      (i) lithium (Li);
      (ii) nickel (Ni);
      (iii) a second element selected from the group consisting of iron (Fe), zinc (Zn), cobalt (Co), aluminum (Al), tin (Sn), chromium (Cr), and magnesium (Mg), wherein the chemical formula of the nickel-contained complex oxide is $LiNi_{1-z}Ma_zO_2$ and wherein z is the range of $0.01 \leq z \leq 0.50$, both inclusive.

2. The non-aqueous electrolyte secondary battery of claim 1, wherein a mixing ratio of the nickel-contained complex oxide to the manganese-contained complex oxide in the positive electrode, in terms of mass ratio (nickel-contained complex oxide/manganese-contained complex oxide), lies within the range of 90/10 to 10/90.

3. The non-aqueous electrolyte secondary battery of claim 1, wherein at least either the positive electrode or the negative electrode includes a positive electrode mixture layer or a negative electrode mixture layer provided on both sides or one side of a positive electrode collector layer or a negative electrode collector layer.

4. The non-aqueous electrolyte secondary battery of claim 1, wherein the negative electrode contains a material capable of occluding and releasing lithium.

5. The non-aqueous electrolyte secondary battery of claim 1, wherein the negative electrode contains at least one material selected from the group consisting of a metal and a semiconductor capable of forming an alloy and a compound with lithium, an alloy and a compound of the metal and the semiconductor, a carbon material, a metal oxide, and a polymer material.

6. The non-aqueous electrolyte secondary battery of claim 5, wherein the negative electrode contains at least one material selected from the group consisting of non-graphitizing carbon, artificial graphite, coke, graphite, glass-like carbon, polymer organic compound calcined materials, carbon fiber, activated carbon and carbon black.

7. The non-aqueous electrolyte secondary battery of claim 5, wherein the negative electrode contains at least one material selected from the group consisting of a Group 4B metal element, a semiconductor element and an alloy and a compound of the metal element and the semiconductor element.

8. The non-aqueous electrolyte secondary battery of claim 5, wherein the negative electrode contains at least one material selected from the group consisting of silicon (Si), tin (Sn), and an alloy and a compound of silicon and tin.

9. The non-aqueous electrolyte secondary battery of claim 1, wherein: the positive electrode and the negative electrode includes a positive electrode mixture layer or a negative electrode mixture layer provided on both sides of either a positive electrode collector or a negative electrode collector made of a band-shaped metal foil; and wherein the positive electrode and the negative electrode are stacked with a microporous separator interposed therebetween and are rolled spirally.

10. The non-aqueous electrolyte secondary battery of claim 1, wherein the electrolyte contains lithium salt and solvent; wherein:

the solvent contains at least one material selected from the group consisting of propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, propionitrile, anisole, ester acetate, ester butyrate and ester propionate.

11. The non-aqueous electrolyte secondary battery of claim 1, wherein the electrolyte contains at least one electrolyte selected from the group consisting of a gel electrolyte in which an electrolyte solution containing lithium salt is held in a polymer compound, a solid electrolyte in which lithium salt is dispersed onto a polymer compound having an ion conductivity, and an electrolyte made of solid inorganic conductor.

12. A material for a positive electrode containing:
(a) a manganese-contained complex oxide containing:
 (i) lithium (Li);
 (ii) manganese (Mn);
 (iii) a first element selected (Ma) from the group consisting of zinc (Zn), cobalt (Co), aluminum (Al), tin (Sn), chromium (Cr), and magnesium (Mg), wherein the chemical formula of the manganese-contained complex oxide is $Li_xMn_{2-y}Ma_yO_4$ and wherein x is the range of $0.9 \leq x \leq 2.0$ and y is in the range of $0.01 \leq y \leq 0.50$, both inclusive; and
(b) a nickel-contained complex oxide containing:
 (i) lithium (Li);
 (ii) nickel (Ni);
 (iii) a second element selected from the group consisting of iron (Fe), zinc (Zn), cobalt (Co), aluminum (Al), tin (Sn), chromium (Cr), and magnesium (Mg), wherein the chemical formula of the nickel-contained complex oxide is $LiNi_{1-z}Ma_zO_2$ and wherein z is the range of $0.01 \leq z \leq 0.05$, both inclusive; and
(c) wherein a mean particle size of the manganese-contained complex oxide and the nickel-contained complex oxide is 30 microns or less.

13. The non-aqueous electrolyte secondary battery of claim 12, wherein a mixing ratio of the nickel-contained complex oxide to the manganese-contained complex oxide in the positive electrode, in terms of mass ratio (nickel-contained complex oxide/manganese-contained complex oxide), lies within the range of 90/10 to 10/90.

14. The non-aqueous electrolyte secondary battery of claim 12, wherein at least either the positive electrode or the negative electrode includes a positive electrode mixture layer or a negative electrode mixture layer provided on both sides or one side of a positive electrode collector layer or a negative electrode collector layer.

15. The non-aqueous electrolyte secondary battery of claim 12, wherein the negative electrode contains a material capable of occluding and releasing lithium.

16. The non-aqueous electrolyte secondary battery of claim 12, wherein the negative electrode contains at least one material selected from the group consisting of a metal and a semiconductor capable of forming an alloy and a compound with lithium, an alloy and a compound of the metal and the semiconductor, a carbon material, a metal oxide, and a polymer material.

17. The non-aqueous electrolyte secondary battery of claim 16, wherein the negative electrode contains at least one material selected from the group consisting of non-graphitizing carbon, artificial graphite, coke, graphite, glass-like carbon, polymer organic compound calcined materials, carbon fiber, activated carbon and carbon black.

18. The non-aqueous electrolyte secondary battery of claim 16, wherein the negative electrode contains at least one material selected from the group consisting of a Group 4B metal element, a semiconductor element, and an alloy and a compound of the metal element and the semiconductor element.

19. The non-aqueous electrolyte secondary battery of claim 16, wherein the negative electrode contains at least one material selected from the group consisting of silicon (Si), tin (Sn), and an alloy and a compound of silicon and tin.

20. The non-aqueous electrolyte secondary battery of claim 2, wherein: the positive electrode and the negative electrode includes a positive electrode mixture layer or a negative electrode mixture layer provided on both sides of either a positive electrode collector or a negative electrode collector made of a band-shaped metal foil; and wherein the positive electrode and the negative electrode are stacked with a microporous separator interposed therebetween and are rolled spirally.

21. The non-aqueous electrolyte secondary battery of claim 2, wherein the electrolyte contains lithium salt and solvent; wherein:

the solvent contains at least one material selected from the group consisting of propylene carbonate, ethylene carbonate, diethyl carbonate, dimethyl carbonate, 1,2-dimethoxyethane, 1,2-diethoxyothane, γ-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, propionitrile, anisole, ester acetate, ester butyrate and ester propionate.

22. The non-aqueous electrolyte secondary battery of claim 2, wherein the electrolyte contains at least one electrolyte selected from the group consisting of a gel electrolyte in which an electrolyte solution containing lithium salt is held in a polymer compound, a solid electrolyte in which lithium salt is dispersed onto a polymer compound having an ion conductivity, and an electrolyte made of solid inorganic conductor.

* * * * *